N. SATO.
VEHICLE SIGNAL.
APPLICATION FILED AUG. 27, 1914.
1,256,264.
Patented Feb. 12, 1918.
2 SHEETS—SHEET 1.
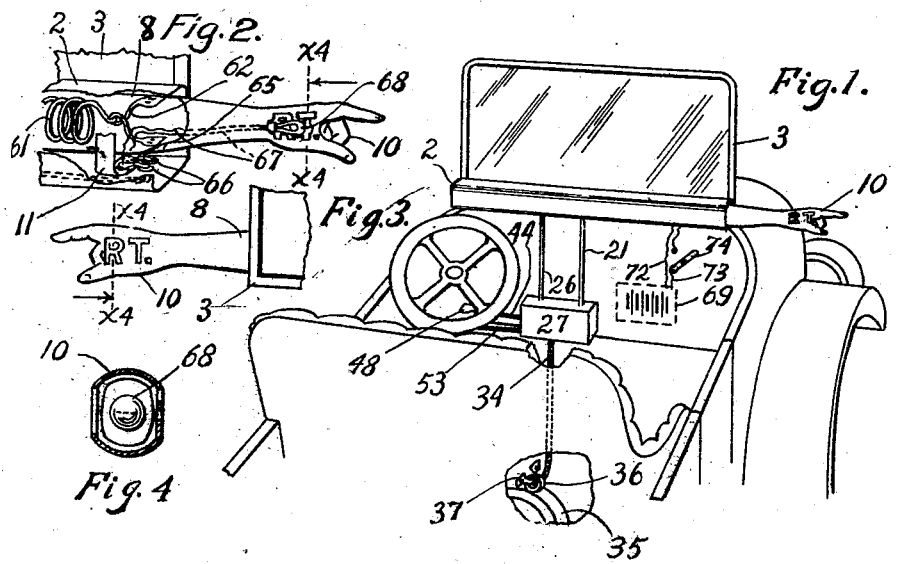
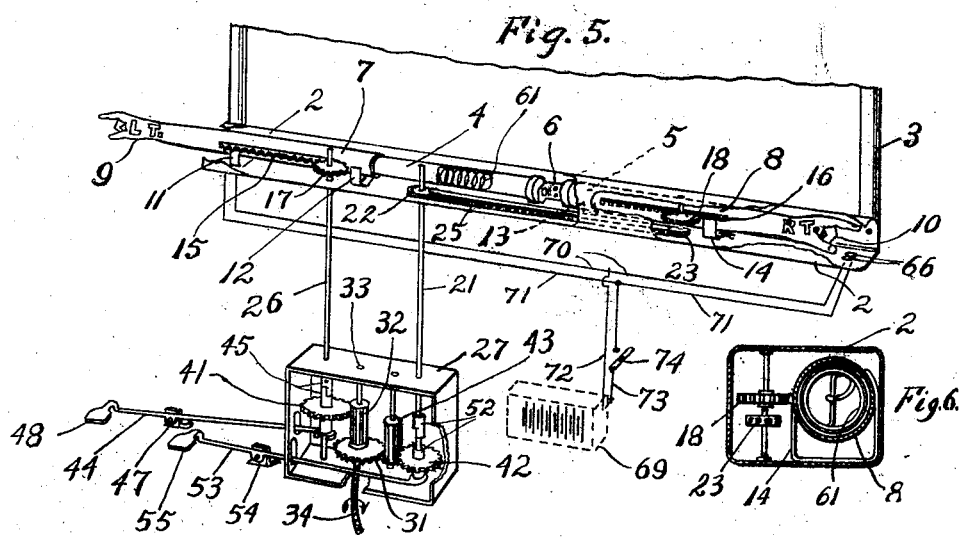
Witnesses:
Wm. F. Bixby
J. Boyd
Inventor
Natsuo Sato
By Albert H. Merrill
Atty

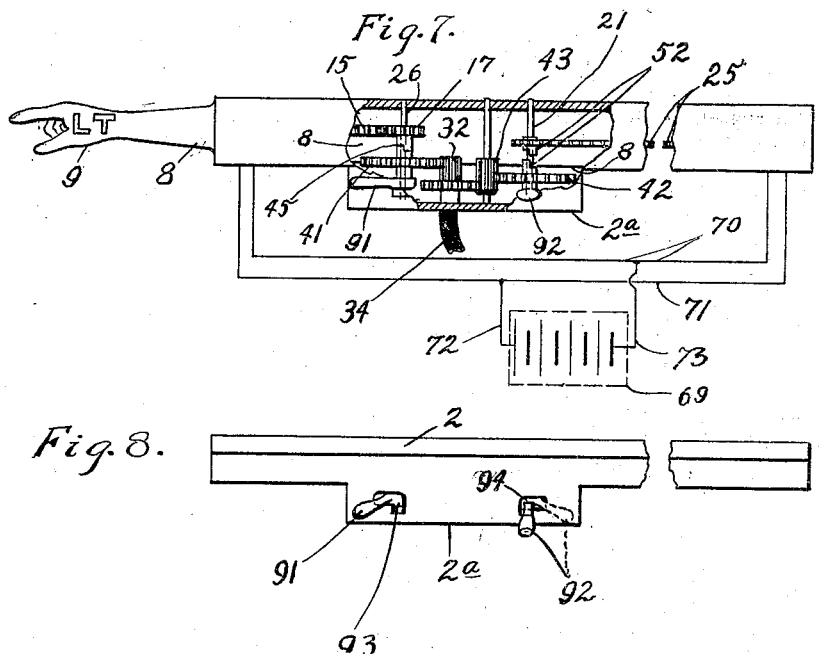

UNITED STATES PATENT OFFICE.

NATSUO SATO, OF LOS ANGELES, CALIFORNIA.

VEHICLE-SIGNAL.

1,256,264.  Specification of Letters Patent.  Patented Feb. 12, 1918.

Application filed August 27, 1914. Serial No. 858,948.

*To all whom it may concern:*

Be it known that I, NATSUO SATO, a subject of the Emperor of Japan, residing in the city of Los Angeles, State of California, have invented a new and useful Vehicle-Signal, of which the following is a specification.

This invention pertains to a mechanical device for displaying a signal to indicate the course the chauffeur or driver of a vehicle intends to take when he reaches an intersecting street, that is to say, where a turn is to be made toward the right or toward the left.

The invention may be embodied in various ways in all of which a signal is projected into view at the side of the vehicle toward which the turn is to be made.

The invention is embodied in a simple compact mechanism which is inexpensive to construct and may readily be adapted to the front portion of automobiles now on the market.

An object of the invention is to provide a visible signal for the purpose stated which is furnished with an illuminated portion which can be seen by night as readily as in the daylight.

Referring to the accompanying drawings which illustrate the invention Figure 1, is a perspective view of a portion of an automobile showing the invention applied thereto.

Fig. 2 is an enlarged perspective detail of the signal proper viewed from the rear, a portion of the casing shown being broken away to illustrate interior construction.

Fig. 3 is a side elevation of the hand shown in Fig. 2 as seen from the front.

Fig. 4 is an enlarged cross section of Figs. 2 and 3 on line $x^4$—$x^4$ thereof.

Fig. 5 is a perspective view of the complete device on a somewhat larger scale than Fig. 1, portions of the casing being broken away to illustrate interior construction.

Fig. 6 is an enlarged cross section of the casing of the signal proper.

Fig. 7 is a side elevation of a modification, the casing being broken away.

Fig. 8 is a view similar to Fig. 7 except that the casing is shown intact and the signals are both retracted.

Referring in detail to the drawings, 2 designates an elongated case rectangular in cross section attached by any suitable means to the lower portion of the wind shield 3.

Along the mid-width of the rear wall of case 2 as seen in Fig. 5, extends a pair of hollow guide rods 4 and 5, the inner ends of said rods being each fastened by a clip 6 to the rear wall of the case 2. Over the rod 4 is telescoped a sleeve 7 and over the rod 5 is telescoped a sleeve 8. The sleeves 7 and 8 respectively carry on their outer ends the indicating hands 9 and 10. Sleeve 7 carries rectangular guiding loops 11 and 12 and the sleeve 8 carries the like guiding loops 13 and 14—these guiding loops all fitting slidably within the rectangular case 2. Sleeve 7 carries a rack 15 and sleeve 8 carries a like rack 16. With rack 15 meshes a gear 17, and with rack 16 meshes a gear 18 which is operatively connected with a shaft 21 by means of the pinions 22 and 23, a sprocket chain 25 connecting said pinions with each other. The gear 17 already referred to is fixed to shaft 26 which, together with shaft 21 extends into the gear case 27.

Within gear case 27 is a main central gear 31 having fixed thereto a fluted or lantern wheel 32, said gears 31 and 32 being mounted on and fixed to a rotary vertical shaft or pintle 33 which is continuously driven by a flexible shaft 34. Said flexible shaft 34, in the embodiment of the invention illustrated in Fig. 1, is driven by the engine fly wheel 35 through the medium of the friction gear 36 mounted upon a bracket 37.

To the left of pintle 33 is a gear 41 which is loosely mounted upon shaft 26 and which is continuously driven by the fluted gear 32. To the right of pintle 33 is another gear 42 which is continuously driven by the central gear 3 through the intermediate fluted gear 43.

When it is desired to rotate the shaft 26 the outer end of foot lever or operating member 44 is depressed and by means of a clutch 45 the gear 41 is moved into fixed relation to the shaft 26. Said lever 44 is fulcrumed on the block or clip 47 and is provided at its outer end with a pedal 48. In like manner gear 42 and clutch 52 are operated by the lever or operating member 53 to move said gear 42 into fixed relation to shaft 21, said lever 53 being fulcrumed on clip 54 and being provided with an operating pedal 55.

Within each of the hollow signal carrying sleeves 7 and 8 is a retracting spring 61 which is secured to the inner wall of each hollow rod near the outer end thereof by a double clip 62 as shown in Fig. 2. The inner end of each spring 61 extends into the adjacent hollow guide rod 4 or 5 and is soldered or otherwise secured thereto near the inner end of said guide rod.

Means are provided for illuminating the signal proper by an electric current as said signal approaches the extended position. Referring to Fig. 2 the guide loop 11 carries a pair of moving contacts 65 which engage the stationary contacts 66 and by means of the wires 67 light the lamp 68 to illuminate the signal proper when the same is fully extended. The letters RT indicate right, and the letters LT left, said letters being illuminated after the manner of an electric sign by an electric current from the battery 69 provided with the wires 70, 71, 72 and 73. Wire 73 may be provided with a switch 74 which is opened in the day time to cut off the current when it is not desired to illuminate the signal.

In Figs. 7 and 8 is shown a modification of the means for controlling the operation of the device. In this form of the invention the case 2 is provided with a downward extension 2ª in which is placed substantially the same gearing as that shown in Fig. 5, the parts thereof being therefore designated by the same reference characters. In place of the foot operated levers or controlling members 44 and 53 controlling handles 91 and 92 are provided which can be moved vertically and laterally within the rectangular slots 93 and 94 to engage and disengage the clutches with the operating mechanism.

In operation of the invention, when the clutch 45 is moved into the operative position, the gear 17 acts upon the rack 15 and moves the left hand out until said hand is fully ejected, at which time the gear 17 reaches the end of rack 15 and, although continuing to rotate operates only to maintain the left hand extended, against the opposition of the retracting spring 61.

The inner end of rack 15 is not shown, but its position will readily be understood from the location of the inner end of the corresponding rack 16 seen in Fig. 5.

While the hand is fully ejected an electric current is maintained through the lamp 68 (if switch 74 is closed) by reason of contact arms 65 resting upon the stationary contacts 66. The operation of the right hand will now be readily understood. When the clutch 52 is moved to the operative position the idle gear 43 and the chain 25 causes the gear 18 to rotate in the proper direction to eject the right hand.

I claim:

1. In a signaling device for motor vehicles, a casing, a rod rigidly mounted within said casing, a sleeve mounted to slide upon said rod and provided with signal means normally contained within said casing, motor driven means for causing said sleeve to slide upon said rod so as to eject said signal means from said casing, said motor driven means being normally out of operative connection with said sleeve, controlling means for placing said motor driven means in operative connection with said sleeve, and spring means for retracting said sleeve and said signal means to normal position upon removal of said motor driven means from operative connection with said sleeve by release of said controlling means.

2. In a signaling device for motor vehicles, slidably mounted means provided with a signal, motor driven means for moving said slidably mounted means so as to bring said signal into signaling position, controlling means for putting said motor driven means into and out of operative connection with said slidably mounted means, and spring means for returning said signal to non-signaling position when said motor driven means is put out of operative connection with said slidably mounted means.

3. A signaling device for motor vehicles comprising a casing extending transversely across the vehicle, two rigidly mounted members within said casing, a sleeve slidably mounted on each of said rigidly mounted members, signal means on each of said sleeves, said sleeves and signal means being normally contained within said casing, motor driven means adapted to move said sleeves in opposite directions, controlling means for putting said motor driven means in operative connection with one or the other of said sleeves to move the corresponding signal means to signaling position, said motor driven means being adapted to be put out of operative connection with said sleeve upon release of said controlling means, and means for returning said signal means to non-signaling position upon removal of said motor driven means from such operative connection.

4. In a signaling device for motor vehicles, a rod rigidly secured to said vehicle, a sleeve slidably mounted on said rod and provided with signal means, spring means attached to and contained within said rod and said sleeve and tending to hold said signal means in non-signaling position, and operating means acting on said sleeve to move said signal means to signaling position against the action of said spring, said spring means being adapted to return said signal to non-signaling position upon removal of said operating means from operative connection with said sleeve.

In testimony whereof I have hereunto signed my name in the presence of two subscribing witnesses at Los Angeles, in the county of Los Angeles and State of California, this 22nd day of August, 1914.

NATSUO SATO.

Witnesses:
ALBERT H. MERRILL,
R. G. ROBERTS.